Dec. 10, 1946. W. T. HONISS 2,412,268
APPARATUS FOR AND METHOD OF SPRAYING GLASS MACHINERY
Filed June 21, 1941 2 Sheets-Sheet 1

Inventor
William T. Honiss
By Brown + Parham
Attorneys

Witness
W. B. Thayer

Dec. 10, 1946.    W. T. HONISS    2,412,268
APPARATUS FOR AND METHOD OF SPRAYING GLASS MACHINERY
Filed June 21, 1941    2 Sheets-Sheet 2
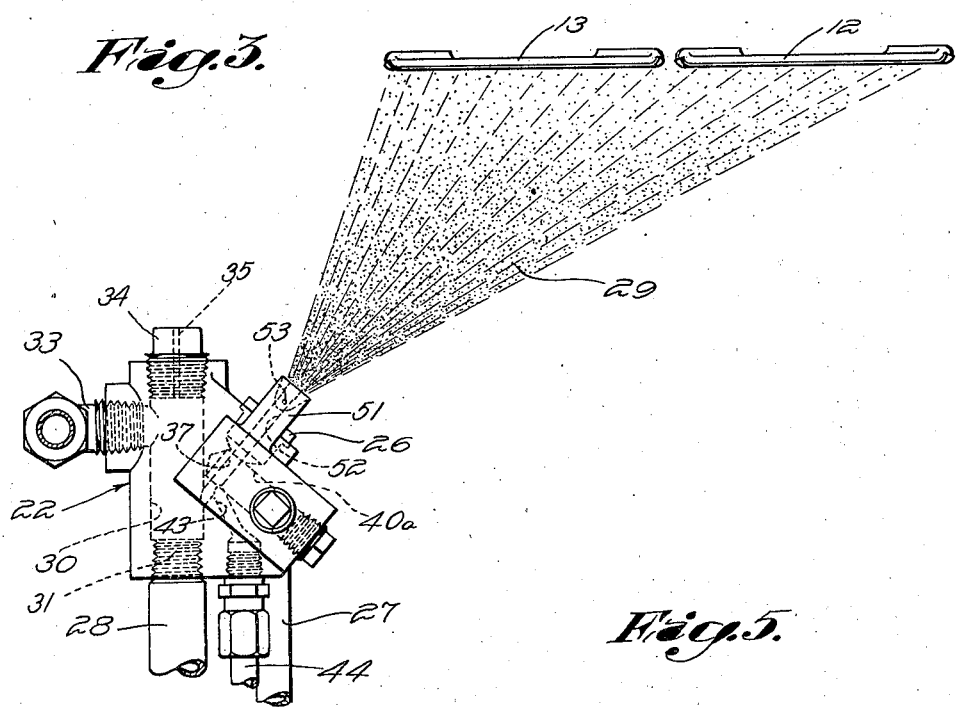
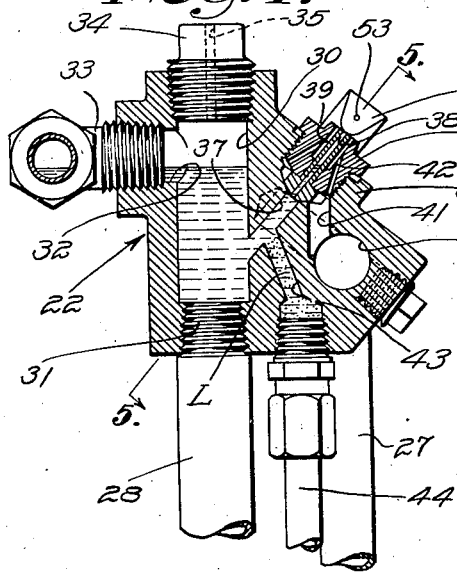
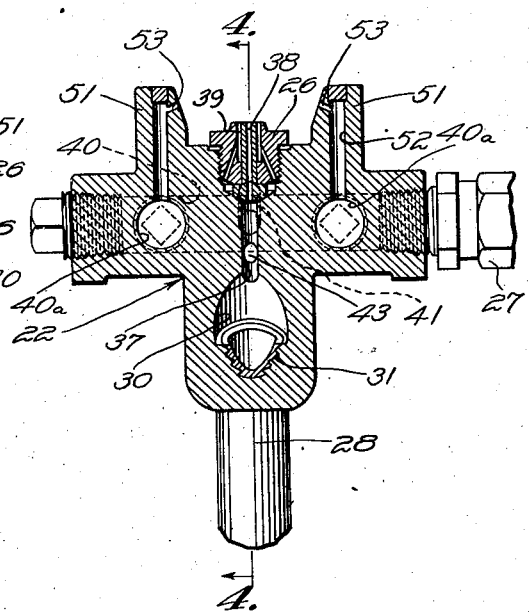
Inventor
William T. Honiss
by Brown + Parham
Attorneys Patented Dec. 10, 1946

2,412,268

UNITED STATES PATENT OFFICE 2,412,268

APPARATUS FOR AND METHOD OF SPRAYING GLASS MACHINERY

William T. Honiss, West Hartford, Conn., assignor to Hartford-Empire Company, Hartford, Conn., a corporation of Delaware Application June 21, 1941, Serial No. 399,164

5 Claims. (Cl. 49—14)

This invention relates to improvements in apparatus for and methods of cooling and lubricating glass machinery, especially the glass cutting blades of a molten glass feeder.

Devices for cooling and lubricating glass cutting blades of glass feeders by discharging a spray of a suitable liquid and air upon such blades when they are in their open or non-cutting positions are in wide-spread use. Water is chiefly used as the liquid component of the spray because it is usually available at relatively low cost and has certain other advantages. A spray of air and water, however, has certain shortcomings, among which may be mentioned the limited lubricating qualities of water, its tendency to rust the metallic parts to which applied, and the presence therein of minerals or other foreign matters which tend to clog and obstruct passages and orifices of the sprayers.

An object of the present invention is to provide a spray for cooling and lubricating glass cutting shear blades or other parts of glass machinery which will be practically free from the shortcomings of the aforesaid prior air and water sprays and at the same time will have substantially all the advantages of the latter.

A further object of the invention is to provide an efficient, reliable and economically usable spray mechanism for combining a substance or substances having good lubricating, cleansing and rust inhibiting properties with water and air to produce a relatively inexpensive but efficient spray for cooling and lubricating the glass cutting blades of a glass feeder or other machine parts.

A further object of the invention is to provide a simple, reliable method for producing and applying to the glass cutting blades of a glass feeder a relatively low-cost, highly efficient cooling and lubricating spray.

A further object of the invention is to improve the construction and mode of operation of a sprayer of the type disclosed in Patent No. 2,230,609, granted to M. M. Cannon, Jr., February 4, 1941, so that the resultant improved sprayer will include means functioning automatically to inject a predetermined variable amount of a suitable cleansing, lubricating and rust inhibiting material into the outgoing stream of water from the sprayer at suitable times in relation to the operations of the shear blades to be sprayed to assure inclusion of such injected material in the spray applied to the shear blades while they are in their open or retracted positions.

A still further object of the invention is to provide a sprayer of the type above referred to with a novel means for flattening the expending mass of spray discharging from the sprayer nozzle to adapt the sprayer for use to spray simultaneously a plurality of juxtaposed shear blades at a cooling and lubricating station.

Other objects and advantages of the invention will hereinafter be pointed out or will become apparent from the following description of the structure and mode of operation of a practical embodiment of the invention, as shown in the accompanying drawings, in which:

Fig. 3 is a relatively enlarged view, showing in elevation one of the spray heads of the spraying apparatus in position to discharge spray onto adjacent shear blades;

Fig. 4 is a vertical section through the spray head, taken substantially along the line 4—4 of Fig. 5; and Fig. 5 is a section through the spray head taken along an inclined plane indicated by the line 5—5 of Fig. 4.

According to the present invention, spray heads for spraying the retracted or open shear blades of a glass feeder may be supplied with a suitable liquid, such as water, and air so as to produce a continuous discharge of spray from each head. Of course, such discharge may be controlled so as to be intermittent and to occur only at the times the shear blades are retracted. However, as a spray formed of water and air is relatively inexpensive, such spray may be continuous without wastage of any expensive component.

Each spray head, as just described, may have suitable adjuncts or provisions in accordance with the present invention for introducing a more expensive, better lubricant and cleansing agent into the spray at the proper times and at a suitable place to be included in the spray that is discharged onto the adjacent shear blade or blades when the latter are retracted. Thus, there is no wastage of the more expensive ingredients of the spray.

Figure 1:
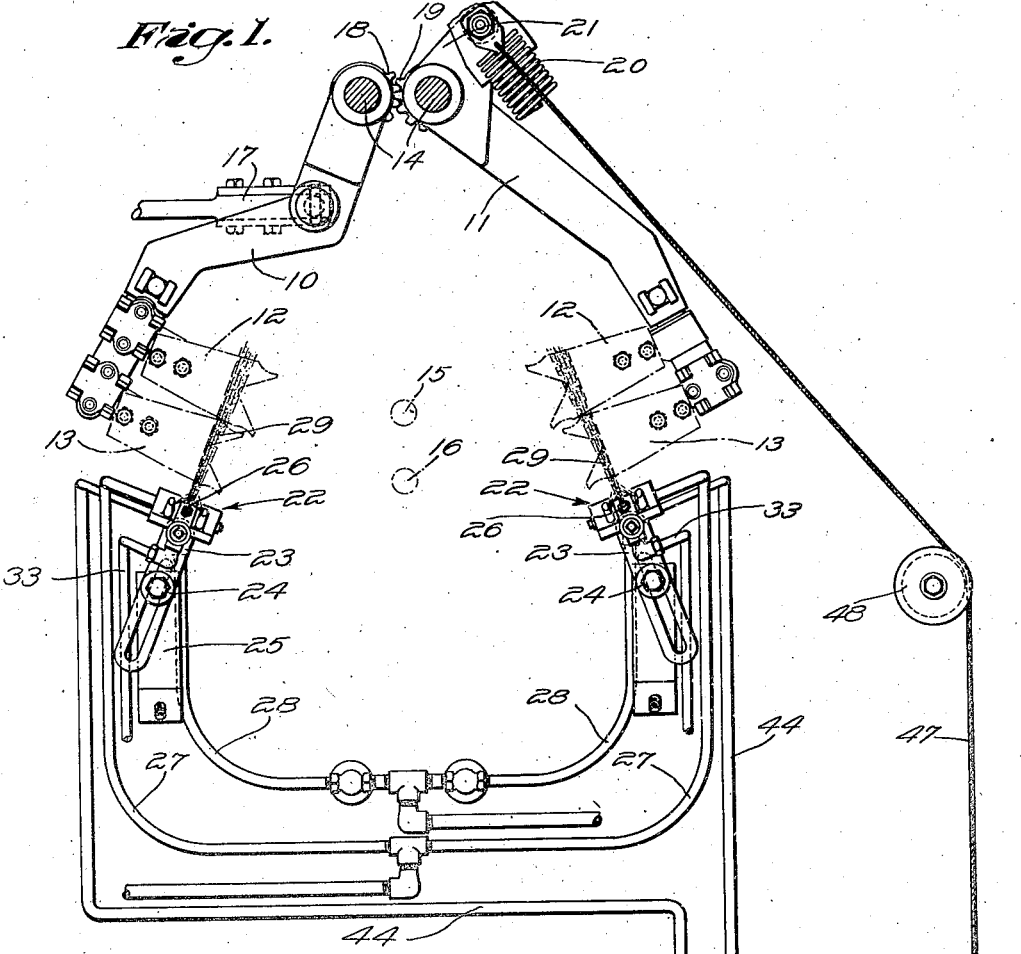
Figure 1 is a plan view of spray apparatus of the present invention arranged to effect the spraying of the blades of duplex shears of a double outlet glass feeder, only the outlet openings of the feeder being shown.

Referring now to the drawings, Fig. 1 shows a pair of pivoted shear arms 10 and 11, respectively, each carrying two adjacent shear blades 12 and 13 respectively. The blades 12 are mounted on the shear arms and operated by them. As the arms are swung toward each other about the axes of their vertical supporting shafts 14, the blades 12 will be closed for the purpose of severing a mold charge (not shown) from molten glass that has descended through a glass feeder outlet, indicated at 15. The blades 13 are similarly moved by the shear arms to sever glass charges from glass that has been fed downwardly through a feeder outlet 16. When the arms are in the positions shown in Fig. 1, the blades are in their retracted or open positions.

The arms 10 and 11 are oscillated in unison toward and away from each other by any suitable means. Such means may comprise a connecting rod 17 connected to the arm 10, enmeshed gears 18 and 19 between and connecting the pivoted ends of the arms 10 and 11, and a coil spring 20 connecting a knuckle 21 on the arm 11 with a fixed support (not shown). With this arrangement, the arms may be moved to their open positions by the connecting rod 17 to open the shear blades and in the reverse directions by the spring 20 to close the shear blades beneath the outlets 15 and 16 when an opposite movement of the connecting rod 17 is permitted. The construction and mode of operation of the means for supporting and operating the shear blades may be substantially as disclosed in Patent No. 1,760,435, granted May 27, 1930, to Peiler. Any other suitable known mechanism for supporting and operating the shear blades may be employed.

When the blades are in their retracted positions as shown in Fig. 1, it is desirable to spray them with a suitable lubricating and cooling spray. According to the present invention, I may make use of a pair of spray heads 22. The respective spray heads are carried by similar arms 23 which are pivotally and slidably mounted, as at 24, Fig. 1, on similar supports 25.

Each spray head 22 may be provided with a nozzle 26, an air supply line 27 and a liquid supply line 28. These liquid and air supply lines may be suitably controlled and provided with air and liquid from suitable sources of supply so that spray, indicated at 29 in Fig. 1 and Fig. 3, of a predetermined regulable volume may be discharged continuously from the nozzles of the spray heads onto the adjacent shear blades.

As shown in Figs. 3 to 5, inclusive, each of the aforesaid spray heads 22 may be formed to provide a vertical liquid feed chamber 30, provided at its lower end with a liquid inlet 31 with which the aforesaid liquid supply pipe 28 is connected. The upper portion of the liquid feed chamber is provided with a lateral outflow opening 32 with which is connected an overflow pipe 33. The liquid feed chamber 30 may be closed at its top by a plug 34 that is provided with a vent 35 to the atmosphere so as to preclude siphoning of liquid through the feed chamber and the overflow line 33.

The wall structure of the spray head at one side of the liquid feed chamber 30 may be laterally enlarged as indicated at 36. This portion of the spray head may include or carry the aforesaid nozzle 26. An inclined liquid discharge passage leads from the lower portion of the liquid feed chamber 30 through the laterally enlarged wall structure of the head through the nozzle 26 and may consist of the communicating passages respectively indicated at 37 and 38. The nozzle 26 is provided with an annular atomizing air passage 39, Figs. 4 and 5, surrounding the outer portion of the aforesaid liquid discharge passage. This atomizing air passage 39 may receive air under pressure from a transverse air manifold passage 40 in the laterally enlarged wall structure 36 of the spray head through connecting passages 41 and 42. The transverse passage 40 is supplied with air under pressure from the aforesaid air line 28.

The liquid in the feed chamber 30 may be maintained at a desired level, such as a level shown in Fig. 4, at which there is a slight overflow continuously through the overflow pipe 33. The liquid discharging through the nozzle is atomized by the air discharging from the atomizing air passage of the same nozzle so as to form a spray discharging into the zone which will be occupied, at least in part, by a shear blade or shear blades on one of the shear arms 10 or 11.

As described so far, except for the spraying by each spray head of two adjacent shear blades simultaneously and the particular form of the laterally enlarged wall structure of the head, both the structure and the mode of operation thereof are substantially as disclosed in the aforesaid Cannon Patent 2,230,609.

As hereinbefore indicated, it is usual to form the spray above referred to of water and air. This spray is improved according to the present invention by periodically introducing a better lubricating and cleansing agent into the water component of such spray. Means by which this may be accomplished will now be described.

The laterally enlarged portion 36 of the wall structure of the spray head is provided with a passage 43 leading from the lower part of such structure into the part 37 of the aforesaid inclined liquid discharge passage of the supply head. A suitable pipe 44 is connected with the lower part of the passage 43. The pipes 44 constitute lubricant delivery pipes between the passages 43 of the spray heads and a suitable injector 45 by which a predetermined variable amount of lubricant will be periodically forced into the connecting line and the passage 43 of each spray head. This will displace a like amount of lubricant from that in the passage 43, indicated at L in Fig. 4, into the liquid in the liquid discharge passage of the spray head.

Figure 2:
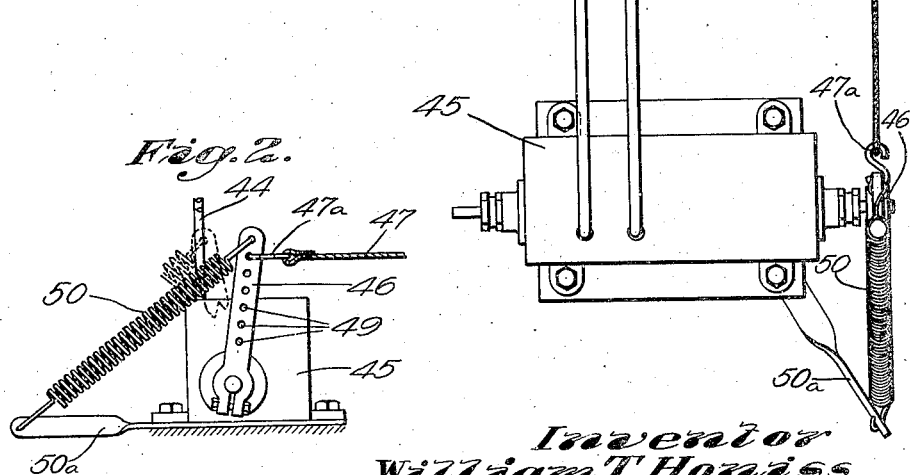
Fig. 2 is an end view of a lubricant injecting mechanism of the apparatus of Fig. 1, showing the adjustable operating connection between the injecting mechanism and the shear mechanism.

The injector 45 may be any suitable known or preferred pump or force feed device which will function substantially as just described. One example of a suitable injector is the McCord Class "B" force feed lubricator, manufactured by the McCord Radiator and Manufacturing Co. of Detroit, Michigan. Such a lubricator includes an oscillatory operating handle 46. When this handle is swung in one direction, as clockwise in Fig. 2, a measured amount of lubricant will be forced from the lubricator into each of the lubricant delivery pipes 44 as and for the purpose above stated.

In carrying out the present invention, the operating handle 46 of the lubricant injector 45 may be connected by an operating cable 47, passing over a guide pulley 48, to the aforesaid knuckle 21 on the shear arm 11. The arrangement is such that when the shear arms are swung apart to move the blades carried thereby to their open positions, the cable 47 will exert a pull on the operating handle 46 as required to swing it in proper direction to force a measured amount of lubricant from the injector 45 into each of the lubricant delivery pipes 44. This amount can be varied by varying the place along the operating handle 46 at which the cable 47 is connected with such handle, as by providing the handle with a series of openings 49 with which a hook or attaching element 47a on the adjacent end of the cable 47 may be engaged selectively. This will vary the amplitude of the lubricator-operating oscillatory throw of the handle 46 and thus vary the amount of lubricant introduced into the liquid discharge passage of each spray head. For effecting a return movement of the operating handle 46, after it has been operated by the cable 47, a coil spring 50 connecting such handle with a fixed arm 50a may be employed.

The lubricant periodically introduced into the liquid component of the spray discharged from the spray head onto the shear blades may be liquid soap which, in practice, has been found to have the desired effect in improving the lubricating action of the complete spray and also has good cleansing and rust inhibiting qualities. Other lubricating and cleansing agents, compounds or mixtures, may be employed. For example, the product sold on the market under the trade name "Dreen" has been used with good results. If the lubrication improving and cleansing agent added to the water and air spray, in accordance with the present invention, lacks rust inhibiting properties, it may be necessary to combine a suitable rust inhibiting agent therewith.

Another feature of the present invention resides in the provision of novel means for controlling the shape in cross-section of the spray produced by the spray head so that the latter may be adapted to spray different objects or structures at different times. Each spray head tends to produce a spray mass of an outwardly expanding conical formation. This form of spray body may be adequate or best adapted to spray a limited area, such as the area occupied by or containing one shear blade. If, however, the spray is to be used to effect spraying of machine parts or objects which occupy a larger area or are of greater extent in one direction, it may be desirable to spread the spray, at least in one direction. To do this, the present invention contemplates making use of a pair of auxiliary air nozzles 51 which respectively are located on the spray head on opposite sides of the nozzle 26 and which discharge convergent streams or jets of air onto opposite sides of the discharging spray. The convergent air streams or jets will serve to flatten the spray mass in one direction and to spread it laterally or transversely in a direction perpendicular thereto. This will transversely enlarge or spread the spray body in the direction required to assure application of spray from the head onto two adjacent shear blades at the same cooling station, as shown in Figs. 1 and 3.

As best seen in Fig. 5, each of the air nozzles 51 has a central passage 52 closed at its outer end and communicating at its inner end through an intermediate passage 40a with the aforesaid air supply passage 40. Inclined jet holes 53 are provided through the inner walls of the upper portions of the air nozzles 51 for discharging the upwardly inclined convergent streams or jets of air onto the spray discharging from the nozzle 26. The air nozzles 51 project beyond the nozzle 26.

The jet holes 53 may be closed or covered by any suitable means, as by caps (not shown) for the air nozzles 51, when it is desired to use a spray body of outwardly expanding conical form, as for the spraying of but a single shear blade at each cooling station or for any other useful purpose.

The invention may be employed to add any suitable and desired ingredient or mixture periodically to any basic spray components, such as air and water or any other suitable liquid. The added ingredient or mixture may have one or more features of advantage, such as superior lubricating value, better cleansing properties, rust inhibiting qualities. The invention is not limited to the details of structure and operation illustrated in the accompanying drawings and herein particularly pointed out as various modifications thereof and changes therein will readily occur to those skilled in the art to which such invention pertains.

I claim:

1. The combination with a glass cutting blade movable periodically between a glass cutting position and a retracted position at which the blade is to be cooled and lubricated, of a spray head for discharging a spray of water and air continuously onto the place occupied by said blade when it is in its retracted position, a normally inactive mechanism adapted, when actuated, to introduce an additional component into said spray, and means operable in response to the movement of the blade from its cutting position toward its retracted position to actuate said mechanism.

2. The combination with a glass cutting blade movable periodically between a glass cutting position and a retracted position at which the blade is to be cooled and lubricated, of a spray head for discharging a spray of water and air continuously onto the place occupied by said blade when it is in its retracted position, a lubricant injector having a delivery passage operatively connected with said spray head and adapted, when actuated, to deliver to said spray head a predetermined amount of a substance having good lubricating, cleansing and rust inhibiting properties, and means operable in response to each movement of the blade from its cutting position toward its retracted position to actuate said injector.

3. The combination with cooperative shear blades movable from spaced retractive positions toward each other to glass cutting positions and back to said retracted positions, of spray heads constructed, arranged and supported to discharge spray of water and air continuously onto the places at which said blades are located when the blades are in their retracted positions, a liquid soap injector having delivery passages operatively connected with said spray heads and adapted, when actuated, to deliver predetermined amounts of liquid soap to said spray heads, and means operable in response to the movements of said shear blades toward their retracted positions to actuate said injector.

4. The method of cooling and lubricating the glass cutting blades of a molten glass feeder which comprises discharging spray of water and air onto said blades, and periodically incorporating predetermined amounts of liquid soap into said spray.

5. The method of cooling and lubricating cooperating glass cutting shear blades which are periodically moved between closed glass cutting positions and open positions, which comprises discharging spray of water and air continuously onto the places at which said blades are located when they are in open positions, and periodically incorporating liquid soap into said spray at times related to the movements of the shear blades to their open positions to assure inclusion of such soap in the spray at the time of application of the spray to the shear blades.

WILLIAM T. HONISS.